(12) United States Patent
Onohara et al.

(10) Patent No.: US 11,271,770 B2
(45) Date of Patent: Mar. 8, 2022

(54) INFORMATION PROCESSING METHOD, INFORMATION PROCESSING APPARATUS, AND INFORMATION PROCESSING SYSTEM

(71) Applicant: SONY CORPORATION, Tokyo (JP)

(72) Inventors: Takashi Onohara, Tokyo (JP); Takuma Higo, Tokyo (JP); Yosuke Umahashi, Tokyo (JP); Taichi Yoshio, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/578,496

(22) PCT Filed: May 11, 2016

(86) PCT No.: PCT/JP2016/002301
§ 371 (c)(1),
(2) Date: Nov. 30, 2017

(87) PCT Pub. No.: WO2016/199346
PCT Pub. Date: Dec. 15, 2016

(65) Prior Publication Data
US 2018/0139071 A1    May 17, 2018

(30) Foreign Application Priority Data

Jun. 11, 2015 (JP) .............................. JP2015-118503

(51) Int. Cl.
*H04L 12/28* (2006.01)
*G06F 13/00* (2006.01)
(Continued)

(52) U.S. Cl.
CPC .......... *H04L 12/2838* (2013.01); *G06F 13/00* (2013.01); *G11B 31/00* (2013.01);
(Continued)

(58) Field of Classification Search
CPC . H04L 65/602; H04L 12/2838; H04L 12/282; H04L 2012/2841;
(Continued)

(56) References Cited

U.S. PATENT DOCUMENTS 9,047,054 B1 * 6/2015 Goldstein ............... G06F 3/165
9,329,831 B1 * 5/2016 Fullerton ............... G06F 3/165
(Continued)

FOREIGN PATENT DOCUMENTS

AU    2010287262 A1    1/2012
CN       1684423 A    10/2005
(Continued)

OTHER PUBLICATIONS

Extended European Search Report of EP Patent Application No. 16807065.4, dated Dec. 17, 2018, 08 pages.
(Continued)

*Primary Examiner* — Philip C Lee
(74) *Attorney, Agent, or Firm* — Chip Law Group

(57) ABSTRACT

To provide an information processing method, information processing apparatus, and information processing system which are capable of achieving a high-quality content listening or viewing experience. An information processing method according to an embodiment of the present technology is executed by a computer, and includes calculating, on a basis of a beacon signal which is transmitted from a reproduction apparatus capable of reproducing a content, a distance from the computer to the reproduction apparatus. On a basis of the calculated distance, a transfer reproduction operation by the reproduction apparatus is controlled, in which a content that is being reproduced by a different reproduction apparatus is transferred and reproduced.

15 Claims, 7 Drawing Sheets

(51) Int. Cl.
  *G11B 31/00* (2006.01)
  *H04Q 9/00* (2006.01)
  *H04N 21/4363* (2011.01)
  *H04N 21/442* (2011.01)
  *H04N 21/436* (2011.01)
  *H04N 21/439* (2011.01)
  *H04N 21/432* (2011.01)
  *H04N 21/414* (2011.01)

(52) U.S. Cl.
  CPC ..... *H04L 12/282* (2013.01); *H04N 21/41407* (2013.01); *H04N 21/439* (2013.01); *H04N 21/4325* (2013.01); *H04N 21/43615* (2013.01); *H04N 21/43637* (2013.01); *H04N 21/44218* (2013.01); *H04N 21/44231* (2013.01); *H04Q 9/00* (2013.01); *H04L 2012/2841* (2013.01); *H04L 2012/2849* (2013.01)

(58) Field of Classification Search
  CPC ............. H04L 2012/2849; G06F 13/00; G06F 3/04847; H04N 21/43078
  See application file for complete search history.

(56) References Cited

U.S. PATENT DOCUMENTS

| | | | |
|---|---|---|---|
| 10,268,357 B2* | 4/2019 | Vega | G06F 3/04842 |
| 2005/0235334 A1 | 10/2005 | Togashi et al. | |
| 2010/0109864 A1 | 5/2010 | Haartsen et al. | |
| 2010/0260348 A1* | 10/2010 | Bhow | H04N 21/25891 |
| | | | 381/81 |
| 2011/0046755 A1 | 2/2011 | Sung et al. | |
| 2011/0307576 A1 | 12/2011 | Miyoshi et al. | |
| 2014/0101705 A1 | 4/2014 | Togashi et al. | |
| 2014/0244807 A1 | 8/2014 | Togashi et al. | |
| 2015/0237222 A1* | 8/2015 | Haider | A61B 90/96 |
| | | | 600/407 |
| 2015/0289124 A1* | 10/2015 | Palin | H04W 8/005 |
| | | | 455/41.2 |
| 2015/0350279 A1* | 12/2015 | Palin | H04L 65/4084 |
| | | | 370/328 |
| 2016/0276873 A1* | 9/2016 | Ben Hanoch | H02J 50/12 |
| 2017/0019267 A1 | 1/2017 | Togashi et al. | |
| 2017/0163330 A1* | 6/2017 | Raleigh | H04L 5/0037 |

FOREIGN PATENT DOCUMENTS

| | | |
|---|---|---|
| CN | 101998157 A | 3/2011 |
| DE | 602005005730 T2 | 5/2009 |
| EP | 1571803 A1 | 9/2005 |
| EP | 2293562 A2 | 3/2011 |
| EP | 2347278 A1 | 7/2011 |
| JP | 2005-100200 A | 4/2005 |
| JP | 2005-250867 A | 9/2005 |
| JP | 2005-303423 A | 10/2005 |
| JP | 4059214 B2 | 3/2008 |
| JP | 2011-045082 A | 3/2011 |
| JP | 2012-034071 A | 2/2012 |
| JP | 5622737 B2 | 11/2014 |
| JP | 2016-025599 A | 2/2016 |
| KR | 10-2006-0043362 A | 5/2006 |
| KR | 10-2011-0020637 A | 3/2011 |
| KR | 10-2011-0020713 A | 3/2011 |
| RU | 2012111219 A | 10/2013 |
| WO | 2010/052531 A1 | 5/2010 |
| WO | 2010/095264 A1 | 8/2010 |
| WO | 2011/025199 A2 | 3/2011 |

OTHER PUBLICATIONS

International Search Report and Written Opinion of PCT Application No. PCT/JP2016/002301, dated Aug. 2, 2016, 11 pages of ISRWO.

Office Action for JP Patent Application No. 2017-523093, dated Dec. 17, 2019, 06 pages of Office Action and 04 pages of English Translation.

Office Action for CN Patent Application No. 201680032407.X, dated Jul. 3, 2020, 12 pages of Office Action and 20 pages of English Translation.

* cited by examiner

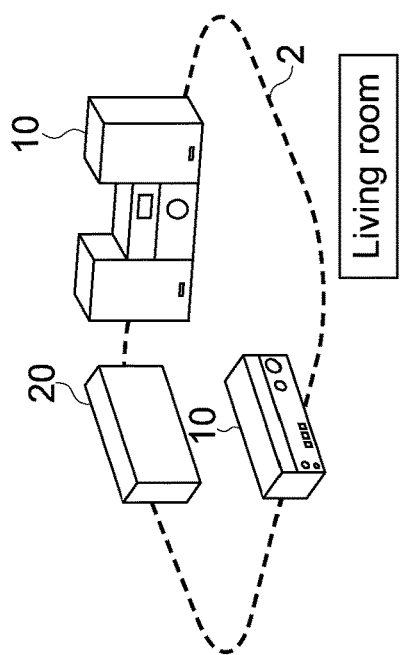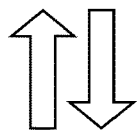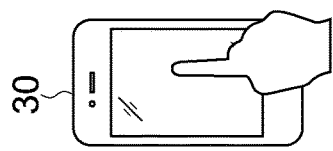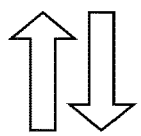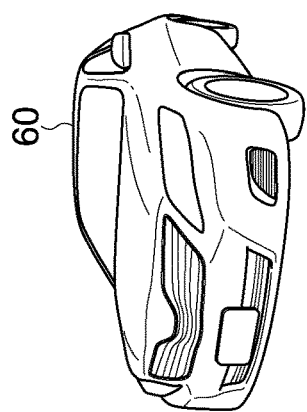
FIG.7

INFORMATION PROCESSING METHOD, INFORMATION PROCESSING APPARATUS, AND INFORMATION PROCESSING SYSTEM

CROSS REFERENCE TO RELATED APPLICATIONS

This application is a U.S. National Phase of International Patent Application No. PCT/JP2016/002301 filed on May 11, 2016, which claims priority benefit of Japanese Patent Application No. JP 2015-118503 filed in the Japan Patent Office on Jun. 11, 2015. Each of the above-referenced applications is hereby incorporated herein by reference in its entirety.

TECHNICAL FIELD

The present technology relates to an information processing method, a program, an information processing apparatus, and an information processing system for controlling a reproduction apparatus capable of reproducing a content.

BACKGROUND ART

From the past, such a system that a home network is constructed in home, and a plurality of reproduction apparatuses connected thereto reproduces contents such as music and video has been known. For example, Patent Literature 1 describes a content reproduction system including a plurality of reproduction apparatuses disposed in each room, a content server, and a portable apparatus.

In this system, each of the reproduction apparatuses is provided with a detection apparatus capable of detecting whether a user is in a certain area with respect to the reproduction apparatuses or not. Therefore, on a basis of a detection result obtained by the detection apparatus, the reproduction apparatus in a room in which the user exists can reproduce a content. Further, also in the case where the user moves from the room, an optimal reproduction apparatus can continuously reproduce the content in accordance with the movement (paragraphs [0027] to [0040] in the description, FIG. 4, and the like of Patent Literature 1).

CITATION LIST

Patent Literature

Patent Literature 1: Japanese Patent Application Laid-open No. 2005-100200

DISCLOSURE OF INVENTION

Technical Problem

Demanded is a technology capable of providing high-quality listening or viewing experiences to a user who listens or views a content with a plurality of reproduction apparatuses as described above.

In view of the circumstances as described above, an object of the present technology is to provide an information processing method, a program, an information processing apparatus, and an information processing system capable of achieving high-quality listening or viewing experiences of contents.

Solution to Problem

To achieve the above object, according to an embodiment of the present technology, an information processing method executed by a computer includes calculating, on a basis of a beacon signal transmitted from a reproduction apparatus capable of reproducing a content, a distance from the computer to the reproduction apparatus.

An operation of transfer reproduction by the reproduction apparatus is controlled on a basis of the calculated distance, the transfer reproduction being causing a content that is being reproduced by a different reproduction apparatus to be transferred and reproduced.

In this information processing method, on the basis of the beacon signal, the distance to the reproduction apparatus is calculated. Then, on the basis of the calculated distance, the operation of the transfer reproduction by the reproduction apparatus is controlled. As a result, a high-quality content listening or viewing experience can be achieved.

The step of controlling the operation of the transfer reproduction may include starting the transfer reproduction by the reproduction apparatus in a case where the distance to the reproduction apparatus is equal to or less than a first threshold value.

As a result, a seamless listening or viewing experience along with a movement of a user who carries the computer can be achieved.

The control of the operation of the transfer reproduction may include at least one of power supply control of the reproduction apparatus and control of a reproduction sound volume of a transfer target content.

By the power supply control or the control of the reproduction sound volume in accordance with the distance to the reproduction apparatus, a high-quality listening or viewing experience can be achieved.

The information processing method may further include: calculating a distance from the computer to the different reproduction apparatus on a basis of a beacon signal transmitted from the different reproduction apparatus. In this case, the step of controlling the operation of the transfer reproduction may include controlling, on the basis of the calculated distance to the different reproduction apparatus, a reproduction operation of a transfer target content by the different reproduction apparatus.

As a result, a high-quality content transfer based on the distance to the reproduction apparatus (different reproduction apparatus) as a transfer source can be achieved.

The step of controlling the operation of the transfer reproduction may include terminating reproduction by the different reproduction apparatus in a case where the distance to the different reproduction apparatus is equal to or more than a second threshold value.

As a result, a high-quality listening or viewing experience in accordance with the movement of the user can be achieved.

Controlling the reproduction operation of the transfer target content by the different reproduction apparatus may include at least one of power supply control of the different reproduction apparatus and control of a reproduction sound volume of the transfer target content.

As a result, a high-quality content transfer can be achieved.

The step of controlling the operation of the transfer reproduction may include causing the operation of the transfer reproduction by the reproduction apparatus to be synchronized with a reproduction operation by the different reproduction apparatus.

As a result, a high-quality content transfer can be achieved.

The step of controlling the operation of the transfer reproduction may include causing a transfer target content to be faded out by the different reproduction apparatus and causing the transfer target content to be faded in by the reproduction apparatus.

As a result, a high-quality content transfer can be achieved.

The step of controlling the operation of the transfer reproduction may include causing a transfer target content reproduced by the computer as the different reproduction apparatus to be transferred to the reproduction apparatus and reproduced by the reproduction apparatus.

The content reproduced by the computer that executes the information processing method according to the present technology is caused to be transferred to the reproduction apparatus, with the result that a high-quality listening or viewing experience can be achieved.

The information processing method may further include: reproducing, by the reproduction apparatus, a content capable of being reproduced by the computer; and terminating reproduction by the reproduction apparatus and reproducing the content by the computer in a case where the distance to the reproduction apparatus is equal to or more than a third threshold value.

As a result, the content can be transferred from the reproduction apparatus to the computer that executes the information processing method, and thus a high-quality listening or viewing experience is achieved.

The information processing method may further include: detecting the reproduction apparatus through wireless communication, and obtaining, from the detected reproduction apparatus, an identification signal for identifying the beacon signal transmitted from the reproduction apparatus; and associating, on the basis of the obtained identification signal, the beacon signal transmitted from the reproduction apparatus with the detected reproduction apparatus.

As a result, for example, in a case where a plurality of reproduction apparatuses is disposed, distances to the reproduction apparatuses can be appropriately calculated.

A program according to an embodiment of the present technology causes a computer to execute:

a step of calculating, on a basis of a beacon signal transmitted from a reproduction apparatus capable of reproducing a content, a distance from the computer to the reproduction apparatus; and a step of controlling an operation of transfer reproduction by the reproduction apparatus on a basis of the calculated distance, the transfer reproduction being causing a content that is being reproduced by a different reproduction apparatus to be transferred and reproduced.

An information processing apparatus according to an embodiment of the present technology includes a calculation unit and a reproduction control unit.

The calculation unit calculates, on a basis of a beacon signal transmitted from a reproduction apparatus capable of reproducing a content, a distance to the reproduction apparatus.

The reproduction control unit controls an operation of transfer reproduction by the reproduction apparatus on a basis of the calculated distance, the transfer reproduction being causing a content that is being reproduced by a different reproduction apparatus to be transferred and reproduced.

An information processing system according to an embodiment of the present technology includes one or more reproduction apparatuses capable of reproducing a content and transmitting a beacon signal and the information processing apparatus.

The information processing apparatus may be capable of reproducing the content. In this case, the reproduction control unit of the information processing apparatus may cause the content reproduced by the information processing apparatus to be transferred to each of the one or more reproduction apparatus and reproduced.

Advantageous Effects of Invention

As described above, according to the present technology, it is possible to achieve the high-quality content listening or viewing experience. It should be noted that the effects described here are not necessarily limited, and any effect described in this disclosure may be exerted.

BRIEF DESCRIPTION OF DRAWINGS

FIG. 7 A diagram for explaining control to cause a content that is being reproduced by a reproduction apparatus to be transferred to a mobile terminal.

MODE(S) FOR CARRYING OUT THE INVENTION

Hereinafter, an embodiment according to the present technology will be described with reference to the drawings.

[Content Reproduction System]

Figure 1:
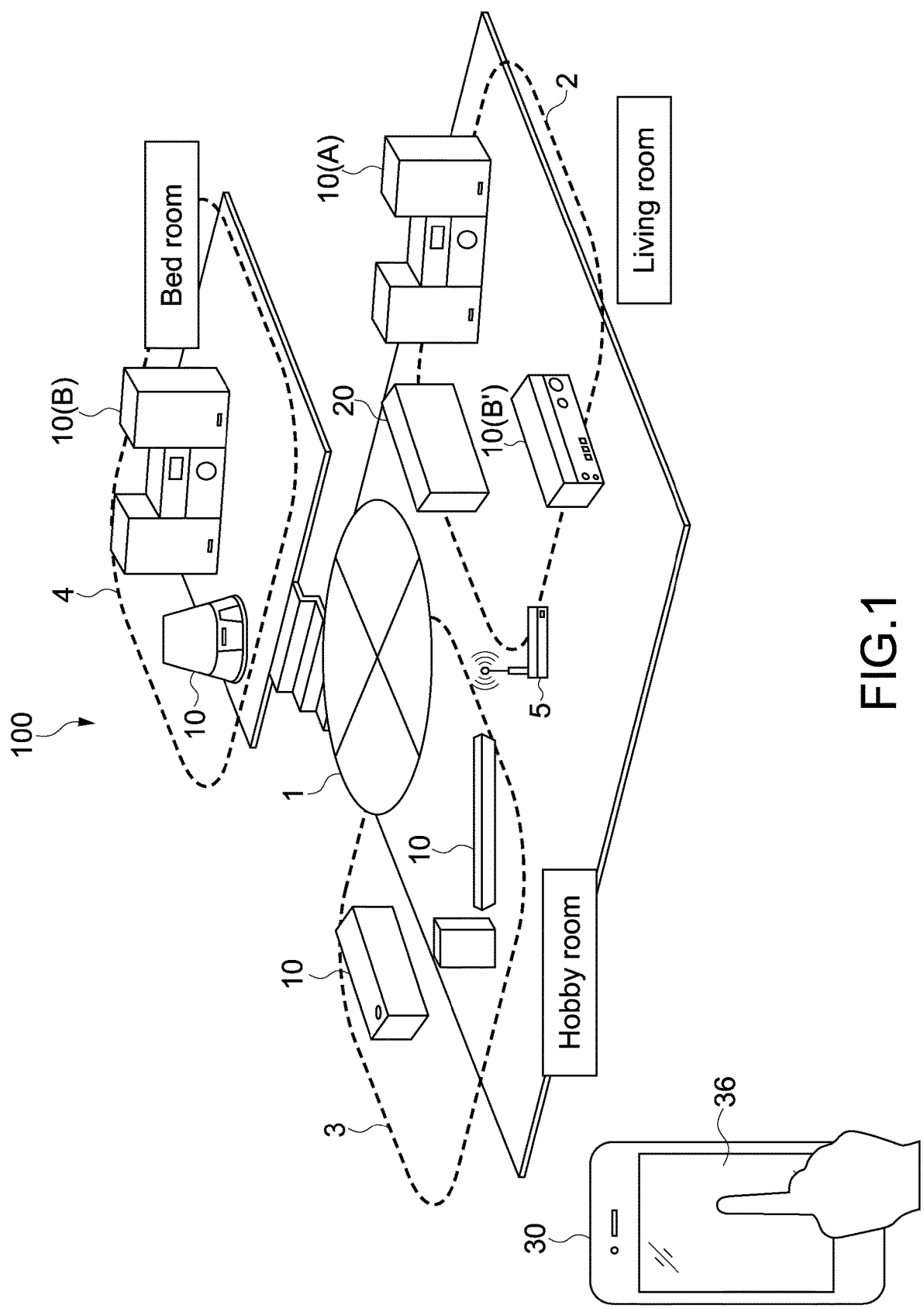
FIG. 1 A schematic diagram showing a configuration example of a content reproduction system according to the present technology.

FIG. 1 is a schematic diagram showing a configuration example of a content reproduction system as an embodiment of an information processing system according to the present technology. A content reproduction system 100 includes a home network 1 constructed in home, a plurality of reproduction apparatuses 10 connected thereto, a server apparatus 20 that provides contents, and a mobile terminal 30. The mobile terminal 30 functions as an embodiment of an information processing apparatus according to the present technology.

The plurality of reproduction apparatuses 10, the server apparatus 20, and the mobile terminal 30 are connected to the home network 1 through an access point 5 by wireless LAN communication such as WiFi. As the home network 1, for example, a network that conforms to DLNA (registered trademark) (Digital Living Network Alliance) standard is used.

In this case, the plurality of reproduction apparatuses 10 functions as a DMR (Digital Media Renderer), and the server apparatus 20 functions as a DMS (Digital Media Server). Further, the mobile terminal 30 functions as a DMC (Digital Media Controller). It should be noted that the present technology can also be applied in a case where a network using another protocol is constructed.

As shown in FIG. 1, the plurality of reproduction apparatuses 10 is disposed in a living room 2, a hobby room 3, and a bed room 4, respectively. When a user operates the mobile terminal 30, the user can instruct the reproduction apparatuses 10 disposed in the respective rooms to reproduce a content in the server apparatus 20.

As the reproduction apparatus 10, an apparatus capable of operating as a DMP (Digital Media Player) may be disposed. In this case, by operating a UI (User Interface) of the reproduction apparatus 10, a content in the server apparatus 20 can be reproduced.

By using near field communication such as Bluetooth (registered trademark) and a global network, it is also possible to cause the reproduction apparatus 10 to reproduce a content. This point will be collectively described later. It should be noted that the numbers of reproduction apparatuses 10, server apparatus 20, and the like are not limited.

In this embodiment, the plurality of reproduction apparatuses 10 reproduces a music content. However, the present technology can be applied not only to reproducing music contents but also reproducing various contents such as video.

Examples of the reproduction apparatus 10 include a television set, a PC (Personal computer), an audio video receiver, a video monitor, and a home game machine. An in-car audio or the like mounted on a vehicle can be used as the reproduction apparatus according to the present technology.

As the server apparatus 20, for example, a PC or an HDD (NAS) or the like compatible with the network can be used. As the mobile terminal 30, typically, a smart phone is used, but the mobile terminal is not limited to this. Various PDAs (Personal Digital Assistants) such as a tablet terminal may be used therefor. In addition, various computers can be used as the information processing apparatus according to the present technology.

[Configuration of Mobile Terminal]

Figure 2:
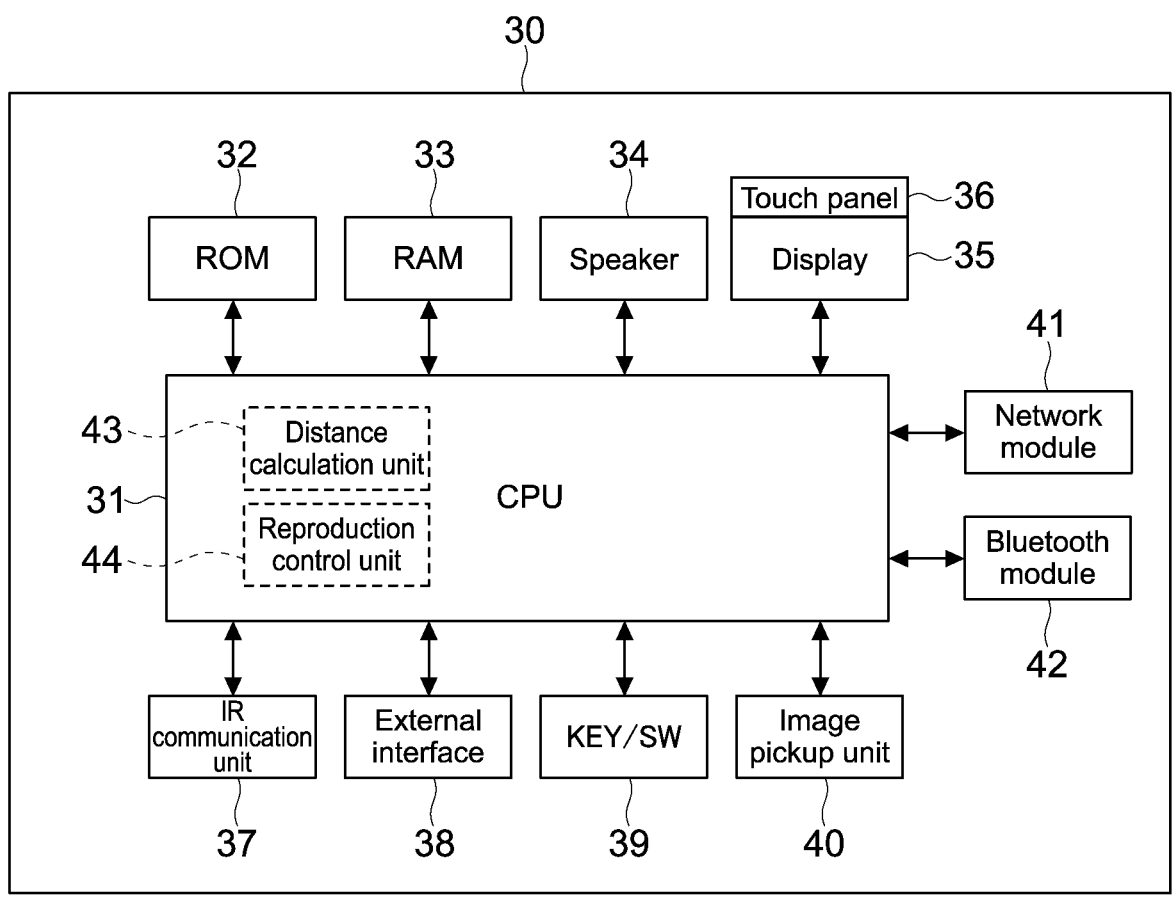
FIG. 2 A block diagram showing a configuration example of a mobile terminal shown in FIG. 1.

FIG. 2 is a block diagram showing a configuration example of the mobile terminal 30. The mobile terminal 30 includes a CPU (Central Processing Unit) 31, a ROM (Read Only Memory) 32, a RAM (Random Access Memory) 33, a speaker 34, a display 35, and a touch panel 36. Further, the mobile terminal 30 includes an infrared ray (IR) communication unit 37, an external interface 38, a key/switch 39, and an image pickup unit 40. Further, the mobile terminal 30 includes a network module 41 and a Bluetooth module 42.

The CPU 31 transmits and receives signals to and from respective blocks of the mobile terminal to perform various computations, and performs overall control of various processes executed in the mobile terminal 30, such as instructions to the reproduction apparatuses 10 to reproduce a content and to the display 35 (touch panel 36) to display an image.

The ROM 32 stores various pieces of data processed by the CPU 31 such as various pieces of image data and metadata and various programs such as applications. The RAM 33 is used as a work area for the CPU 31. When a program such as an application is executed, various pieces of data necessary for the execution are read to the RAM 33.

Instead of or in addition to the ROM 32, an HDD (Hard Disk Drive) or a nonvolatile memory such as a flash memory and another solid-state memory may be provided. In those storage devices, various pieces of data and programs described above may be stored.

The speaker 34 outputs voice (music) on a basis of data of a music content. That is, in this embodiment, the mobile terminal 30 can reproduce a music content. The display 35 is, for example, a display device that uses liquid crystal, EL (Electro-Luminescence), or the like, and displays a video content or the like. As shown in FIG. 2, the display 35 is configured integrally with the touch panel 36.

The IR communication unit 37 is a module for performing IR communication with an external apparatus. The external interface 38 is, for example, an interface for connecting with an external apparatus on a basis of a standard such as an HDMI (registered trademark) (High-Definition Multimedia Interface) and a USB.

The key/switch unit 39 receives an operation or the like by a user which cannot be input with the touch panel 36, such as a power switch and a shortcut key, for example. The image pickup unit 40 includes, for example, a CMOS (Complementary Metal Oxide Semiconductor) or CCD (Charge Coupled Devices) sensor, and generates a digital image of a subject.

The network module 41 is an interface for connecting to the home network 1, and a wireless LAN module such as WiFi is used therefor, for example. When the network module 41 operates, wireless communication can be performed with the reproduction apparatus 10 and the server apparatus 20.

The Bluetooth module 42 is a module for executing near field communication (hereinafter, referred to as Bluetooth communication) based on a Bluetooth standard among the plurality of reproduction apparatuses 10. Through the near field communication, the operation of the reproduction apparatus 10 can be controlled. Further, in this embodiment, the Bluetooth module 42 can receive a beacon signal by using BLE (Bluetooth Low Energy). It should be noted that near field communication or a beacon signal based on another standard may be used.

The information processing by the mobile terminal 30 having the hardware configuration as described above is achieved by software stored in the ROM 32 or the like and a hardware resource of the mobile terminal 30 in cooperation with each other. For example, when the CPU 31 loads programs (applications) according to the present technology stored in the ROM 32 or the like to the RAM 33 and executes the programs, an information processing method according to the present technology is achieved.

At this time, as shown in FIG. 2, the CPU 31 doubles as a distance calculation unit 43 and a reproduction control unit 44. To achieve those blocks, dedicated hardware may be used as appropriate.

The programs such as the applications are installed from a global network to the mobile terminal 30, for example. Alternatively, the programs may be installed to the mobile terminal 30 through a recording medium.

[Reproduction of Content]

Figure 3:
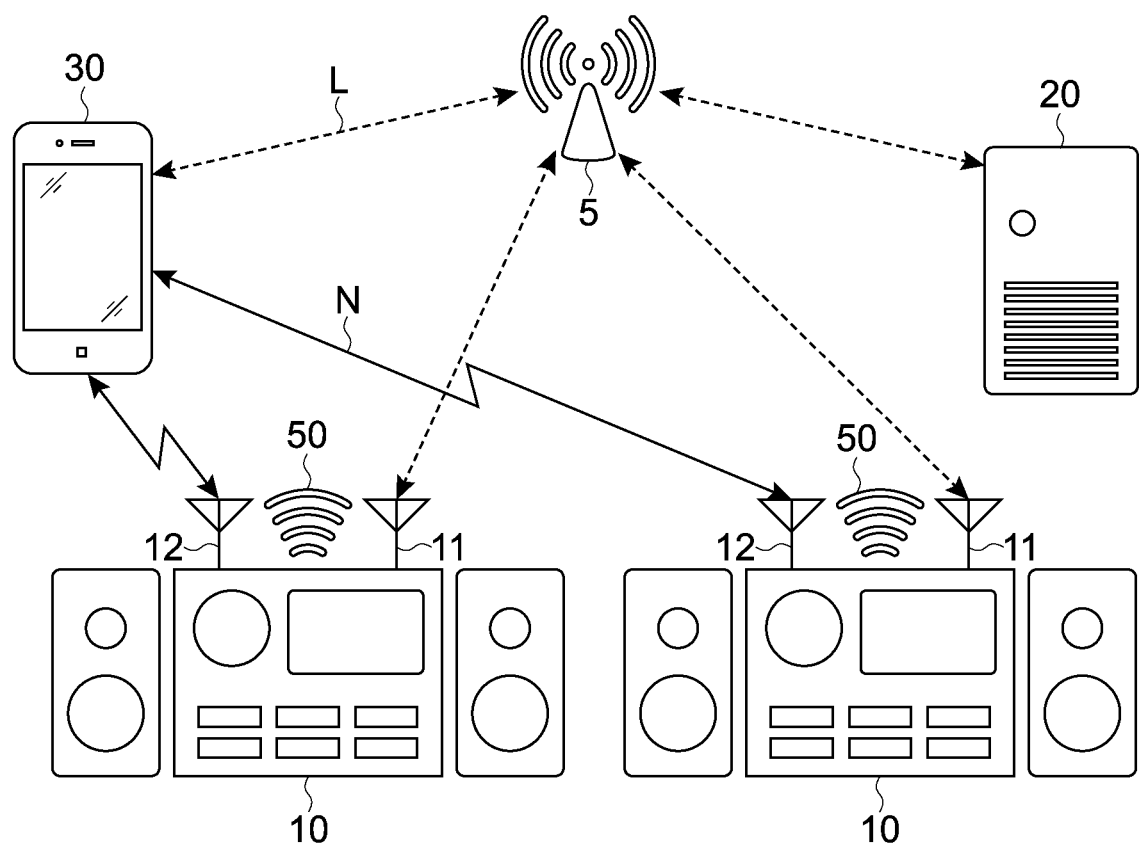
FIG. 3 A schematic diagram showing a connection mode of a plurality of reproduction apparatuses, a server apparatus, and the mobile terminal.

FIG. 3 is a diagram schematically showing a connection mode of the plurality of reproduction apparatuses 10, the server apparatus 20, and the mobile terminal 30. It should be noted that, to each of the plurality of reproduction apparatuses 10, a network module 11 and a Bluetooth module 12 are provided.

As described above, the plurality of reproduction apparatuses 10, the server apparatus 20, and the mobile terminal 30 can be connected to each other through the access point 5 by the wireless LAN communication (broken line arrow L). For example, the mobile terminal 30 uses a control message or the like of UPnP (Universal Plug and Play), to transmit an instruction to the reproduction apparatuses 10 to obtain and reproduce a content from the server apparatus 20.

Further, by transmitting the control message or the like, the mobile terminal 30 can control a reproduction operation of the content by the reproduction apparatuses 10. For example, it is possible to perform various control such as power control (for example, switching between a standby state and an active state) of the reproduction apparatuses 10, control of reproduction sound volume of the content, switching contents to be reproduced, fade-in/fade-out of the content, and the like.

Further, through the Bluetooth communication, the mobile terminal 30 can be directly connected with the reproduction apparatuses 10 (solid line arrow N). Through the Bluetooth communication, a transfer or streaming distribution of the content is performed from the mobile terminal 30 to the reproduction apparatuses 10, and the content can be reproduced by the reproduction apparatuses 10. Further, by the Bluetooth communication, the reproduction operation by the reproduction apparatuses 10 can be controlled.

Although not shown in FIG. 3, the plurality of reproduction apparatuses 10, the server apparatus 20, and the mobile terminal 30 are connected to a global network such as the Internet. For example, through a predetermined gateway, the home network 1 and the global network are connected. When a user operates the mobile terminal 30, the user can cause the reproduction apparatuses 10 to reproduce contents in a content providing service constructed on the global network (on cloud).

For example, the mobile terminal 30 transmits a URL (Uniform Resource Locator) or the like that indicates an address of a content to the reproduction apparatuses 10, and causes the content on the cloud to be obtained and reproduced on the basis of the URL. An instruction to obtain the content may be executed by the wireless LAN communication or by the Bluetooth communication.

Further, through the wireless LAN communication or the Bluetooth communication, the mobile terminal 30 can instruct to reproduce local contents in the reproduction apparatuses 10. The local contents in the reproduction apparatuses 10 are contents read through a CD or a USB or taken from a radio or the like, for example.

As described above, various methods of causing the reproduction apparatuses 10 to reproduce the content are provided. In addition to those, it is possible to transfer and distribute a content in the mobile terminal 30 to the reproduction apparatuses 10 via the home network 1, or transmit an instruction to obtain and reproduce a content from the server apparatus 20 through the Bluetooth communication.

Further, in this embodiment, the plurality of reproduction apparatuses 10 can be synchronized to cause the same content to be reproduced, that is, content synchronous reproduction can be performed. The content synchronous reproduction is achieved by causing reproduction operations by the reproduction apparatuses 10 to be synchronized to each other.

By the content synchronous reproduction, in the plurality of reproduction apparatuses 10, the same content is reproduced on the same reproduction position. In addition, control of a reproduction sound volume, switching of contents, and the like can be performed in synchronization with each other. On the other hand, it is also possible to individually perform control of the reproduction sound volume, control of fade-in/fade-out, or the like with respect to the reproduction apparatuses while causing the reproduction positions to be synchronized with each other (this case is also included in the content synchronous reproduction).

For example, the content synchronous reproduction can be achieved by transmitting an instruction to perform synchronous reproduction to the plurality of reproduction apparatuses 10 as targets of the synchronous reproduction. Alternatively, out of the plurality of reproduction apparatuses 10, from one reproduction apparatus 10, a reproduction content of the reproduction apparatus 10 can be synchronously distributed to the other reproduction apparatuses 10.

The content synchronous reproduction may be performed by synchronously distributing the same content from the mobile terminal 30 to the plurality of reproduction apparatuses 10. In addition, an arbitrary technology for achieving the synchronous reproduction may be used. It should be noted that a content in the server apparatus 20, a content on the cloud, and a local content in the reproduction apparatus 10 can be synchronously reproduced.

[Transfer Reproduction of Content]

Content transfer reproduction will be described. The content transfer reproduction means that a content that is being reproduced by a different reproduction apparatus 10 is transferred and reproduced. In this embodiment, when a user moves with the mobile terminal 30, the reproduction apparatus 10 close to the user automatically performs the content transfer reproduction.

In the following description, out of the plurality of reproduction apparatuses 10, the reproduction apparatus 10 as a transfer source, which is reproducing a content to be subjected to transfer reproduction (hereinafter, referred to as a transfer target content) is referred to as a reproduction apparatus A (see FIG. 5). Further, the reproduction apparatus 10 as a transfer destination, to which the transfer target content is transferred and which reproduces the content is referred to as a reproduction apparatus B (see FIG. 5 as above). The reproduction apparatus A as the transfer source corresponds to the "different reproduction apparatus" in this embodiment.

As shown in FIG. 3, the reproduction apparatuses 10 can transmit a beacon signal 50 by using BLE by the Bluetooth module 12. To the beacon signal 50, a unique identification signal (hereinafter, referred to as beacon ID) for identifying the beacon signal is added. For example, as the beacon ID, a Bluetooth address or the like is used.

Figure 4:
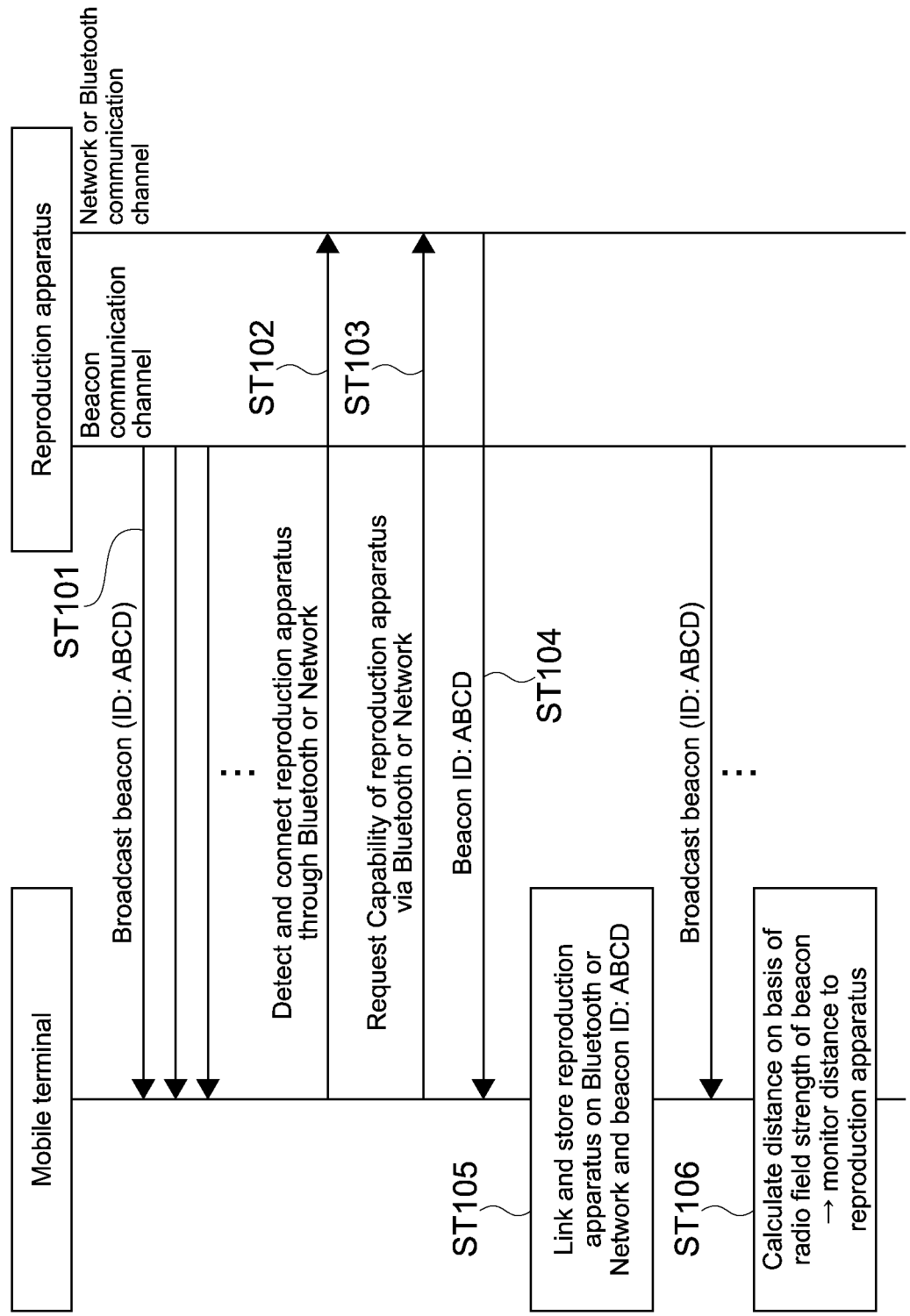
FIG. 4 A sequence diagram showing an example of linking for specifying a reproduction apparatus that transmits a beacon signal.

FIG. 4 is a sequence diagram showing an example of linking for specifying the reproduction apparatus 10 that has transmitted the beacon signal 50. In FIG. 4, a communication channel of the beacon signal 50 and a communication channel of the Bluetooth communication or wireless LAN communication are separately shown.

The reproduction apparatus 10 transmits beacon signals (ID: ABCD) at certain intervals on the beacon communication channel by broadcasting (Step 101). On the other hand, when an application according to the present technology is started, the mobile terminal 30 detects and connects the reproduction apparatus 10 by the Bluetooth communication or wireless LAN communication (Step 102). Further, the mobile terminal 30 requests Capability of the connected reproduction apparatus 10 through the Bluetooth communication or wireless LAN communication (Step 103).

The Capability of the reproduction apparatus 10 includes information relating to a function of the reproduction apparatus 10 such as a kind of a content that can be reproduced. In this embodiment, the Capability includes the beacon ID (ID: ABCD) of the beacon signal 50 transmitted from the reproduction apparatus 10. Therefore, the mobile terminal 30 can obtain the beacon ID (ID: ABCD) by obtaining the Capability from the reproduction apparatus 10 (Step 104).

By the mobile terminal 30, the reproduction apparatus 10 connected through the Bluetooth communication or wireless LAN communication and the obtained beacon ID (ID: ABCD) are linked and stored (Step 105). The mobile terminal 30 scans the beacon signal 50, and obtains a radio field strength of the received beacon signal 50 and the beacon ID (ID: ABCD).

The distance calculation unit 43 shown in FIG. 2 calculates a distance from the mobile terminal 30 to the reproduction apparatus 10 linked with the beacon ID on a basis of the radio field strength. Each time the beacon signal 50 is received, the distance is calculated. Thus, the distance to the reproduction apparatus 10 can be monitored (Step 106). For each of the plurality of reproduction apparatuses 10, the linking (associating) described above is performed, it is possible to monitor the distance to the respective reproduction apparatuses 10 appropriately with high accuracy.

Figure 5:
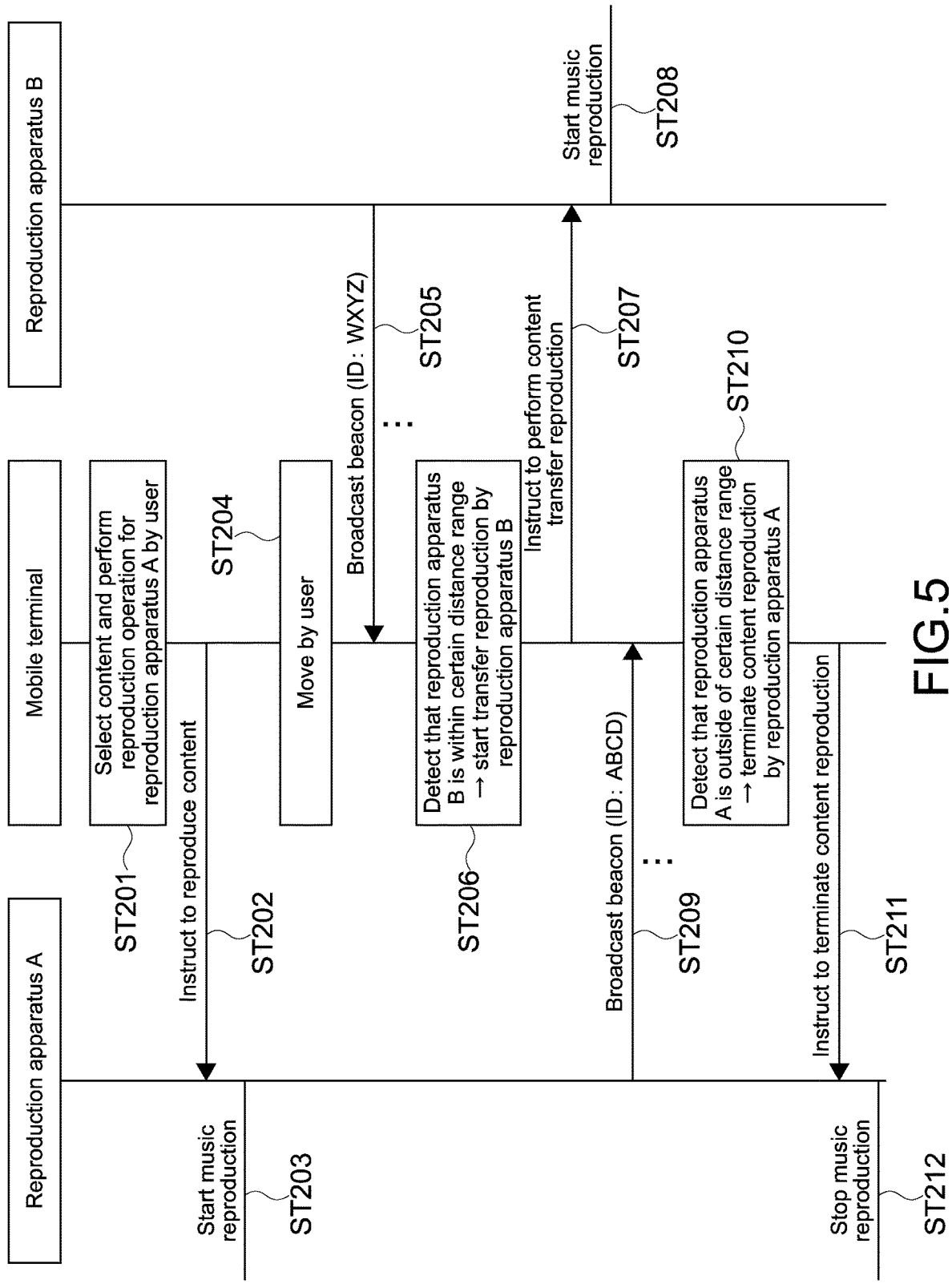
FIG. 5 A sequence diagram showing an example of a transfer of a content from a reproduction apparatus as a transfer source to a reproduction apparatus as a transfer destination.

FIG. 5 is a sequence diagram showing an example of a transfer from the reproduction apparatus A as the transfer source to the reproduction apparatus B as the transfer destination. For example, an assumption is made that a user moves from the living room 2 to the bed room 4 shown in FIG. 1 with the mobile terminal 30. Then, a content is transferred from the reproduction apparatus A in the living room 2 to the reproduction apparatus B in the bed room 4.

First, the user uses the mobile terminal 30 to select a content, and inputs a reproduction operation to the reproduction apparatus A (Step 201). The mobile terminal 30 instructs the reproduction apparatus 10 to reproduce the content (Step 202). As a result, the reproduction apparatus A starts to reproduce the content (Step 203). It should be noted that the content is a transfer target content.

The user moves from the living room 2 to the bed room (Step 204). From the reproduction apparatus B in the bed room 4, the beacon signal 50 is transmitted at certain intervals and is received by the mobile terminal 30 (Step 205). The distance calculation unit 43 calculates a distance to the reproduction apparatus B. Then, on a basis of the calculated distance, the reproduction control unit 44 controls an operation of the content transfer reproduction by the reproduction apparatus B.

Specifically, whether the distance to the reproduction apparatus B is equal to or less than a certain distance (equal to or less than a first threshold value) or not is determined. In the case where a determination result indicates Yes, the reproduction apparatus B starts the transfer reproduction (Step 206). To achieve this, the mobile terminal 30 gives an instruction to the reproduction apparatus 10 to perform the transfer reproduction of the transfer target content (Step 207). The reproduction apparatus B that receives the instruction starts the transfer reproduction (Step 208).

It should be noted that, in this embodiment, the content synchronous reproduction is instructed at a time when the content is transferred. That is, the transfer reproduction operation by the reproduction apparatus B is synchronized by the reproduction operation by the reproduction apparatus A. Thus, in both of the living room 4 and the bed room 2, the same content can be reproduced on the same reproduction position. As a result, such a very interesting, high-quality listening or viewing experience that the content reproduction follows the movement of the user, that is, music reproduction follows the user in a viewpoint of the user can be obtained.

As the control of the transfer reproduction based on the distance, power control of the reproduction apparatuses 10 may be performed. For example, in the case where the reproduction apparatus B in the bed room 4 is in a standby state, when the user moves within a predetermined distance (which may differ from the first threshold value), the reproduction apparatus is switched to an active state. This can save a trouble of operating the power supply, and a high operability can be exerted.

Further, on the basis of the distance to the reproduction apparatus B, a reproduction sound volume of the transfer target content may be controlled. For example, the control is performed in such a manner that, as the distance to the reproduction apparatus B is shorter, the reproduction sound volume is increased. As a result, as the user approaches the reproduction apparatus B in the bed room 4, the transfer target content is faded in. Consequently, the user can enjoy the content smoothly along with the movement of the user. It should be noted that the content may be faded in at the time of starting the transfer reproduction irrespective of variation of the distance.

As shown in FIG. 5, the beacon signal transmitted from the reproduction apparatus A as the transfer source disposed in the living room 2 is received by the mobile terminal 30 (Step 209). The distance calculation unit 43 calculates a distance to the reproduction apparatus A. Then, the reproduction control unit 44 controls the reproduction operation by the reproduction apparatus A on a basis of the calculated distance.

Specifically, whether the distance to the reproduction apparatus A is equal to or more than a certain distance (equal to or more than a second threshold value) or not is determined. In the case where a determination result indicates Yes, the reproduction by the reproduction apparatus A is terminated (Step 210). To achieve this, the mobile terminal 30 gives an instruction to the reproduction apparatus A to terminate the reproduction (Step 211). The reproduction apparatus 10 that receives the instruction terminates the reproduction of the content (Step 212).

As the control of the reproduction operation of the retransmission device A, power control of the reproduction apparatus A or control of the reproduction sound volume may be performed. For example, As the user gets out of the living room 2 and moves away from the reproduction apparatus A, the reproduction sound volume is faded out. Then, upon termination of reproduction of the content, the reproduction apparatus A is switched to the standby state. As a result, the content can be transferred smoothly. Further, the user does not have to operate the reproduction apparatus A as the transfer source, and thus a very high operability can be exerted. It should be noted that fading out may be performed irrespective of variation of the distance.

The content transfer enables the user to continuously enjoy the content in the destination where the user moves only by moving thereto with the mobile terminal 30. The number of times of the content transfers is not limited, for example, three or more reproduction apparatuses B may continuously perform the transfer reproduction. Further, a content that is being synchronously reproduced by a plurality of reproduction apparatuses A may be transferred to a plurality of reproduction apparatuses B in a movement destination of the user at the same time. That is, both of the numbers of reproduction apparatuses A as the transfer source and reproduction apparatuses B as the transfer destination are not limited.

The first threshold value as a reference to start the transfer reproduction, the second threshold value as a reference to terminate the reproduction at the transfer source, or the distance as a reference to perform power supply control or the like are not limited and may be set as appropriate. For example, as the threshold values or the distance as the references, relative values may be set. That is, on a basis of a relative relationship (ratio) between the distance to the reproduction apparatus A as the transfer source (hereinafter, referred to as distance A) and the distance to the reproduction apparatus B as the transfer destination (hereinafter, referred to as distance B), the threshold values or the like may be set in each case.

For example, in the case where the distance B is less than the distance A, the transfer reproduction is started. Until the distance A becomes equal to or more than a double of the distance B, the two reproduction apparatuses A and B execute the synchronous reproduction. In the case where the distance A becomes equal to or more than the double of the distance B, the reproduction apparatus A as the transfer source terminates the reproduction. This control can be performed, for example.

As the threshold values or the distance as the reference, absolute values may be set. For example, the transfer reproduction is started by all the reproduction apparatuses 10 within a range of 10 m. Alternatively, out of the reproduction apparatuses 10 within the range of 10 m, a nearest reproduction apparatus 10 starts the transfer reproduction. For example, this control can be performed.

The first and second threshold values or the distance as another reference may be set as appropriate on a basis of a size of a house, a facility, or the like in which the content reproduction system 100 is constructed, a distance between the reproduction apparatuses 10, a listening or viewing experience required by a user, or the like. This can be set by operating the mobile terminal 30.

Figure 6:
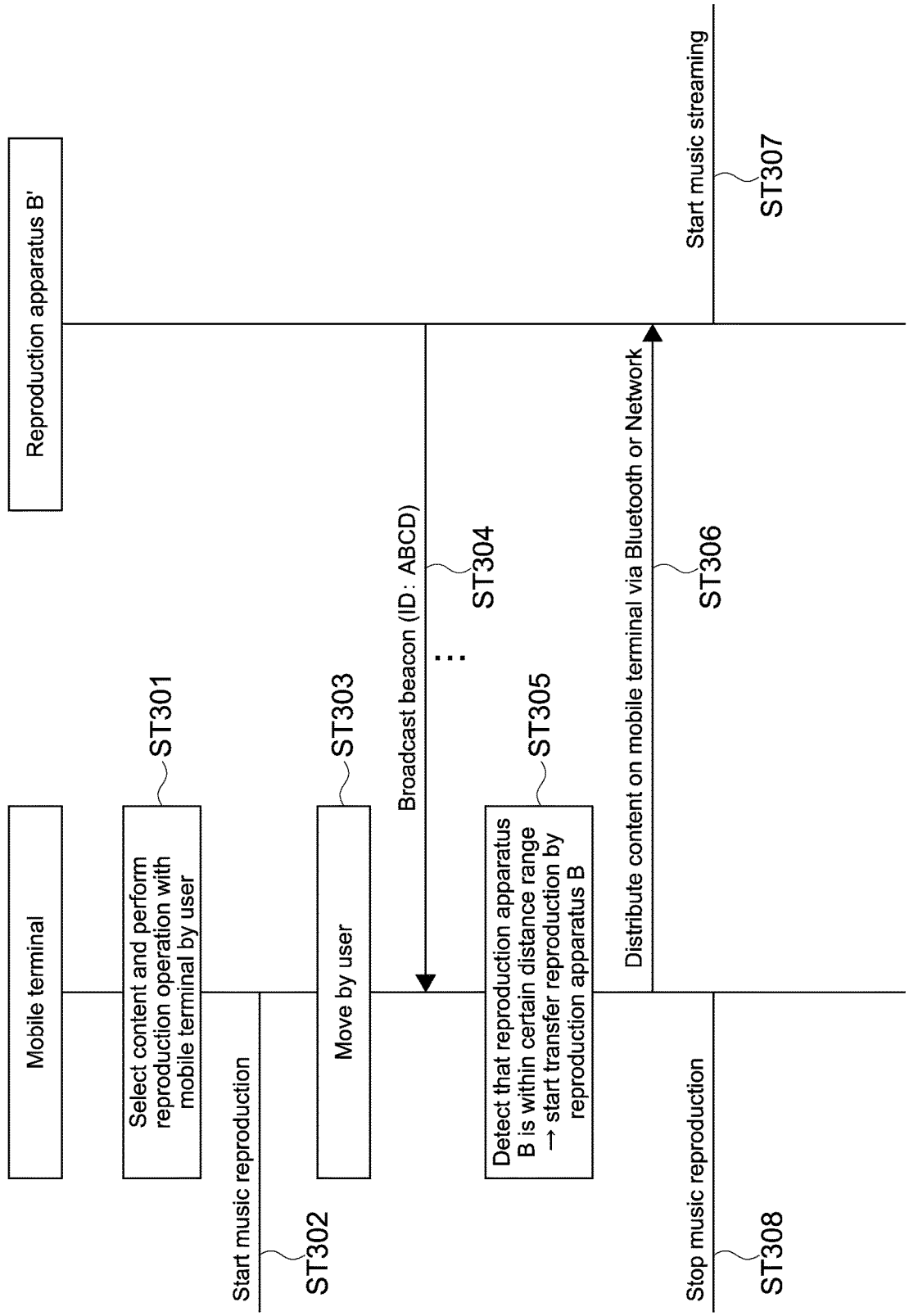
FIG. 6 A sequence diagram showing an example of a transfer of a content from a mobile terminal to a reproduction apparatus as a transfer destination.

FIG. 6 is a sequence diagram showing an example of a transfer of a content from the mobile terminal 30 to the reproduction apparatus B as the transfer destination. In this embodiment, on a basis of a distance to the reproduction apparatus B as the transfer destination, the content reproduced by the mobile terminal 30 can be caused to be transferred and reproduced.

For example, an assumption is made that the user goes back home with the mobile terminal 30 and enters the living room 2 shown in FIG. 1. Then, from the mobile terminal 30, the content is transferred to a reproduction apparatus B' in the living room 2.

First, the user inputs a reproduction operation of the content to the mobile terminal 30 (Step 301), and then the mobile terminal 30 starts to reproduce the content (Step 302). The user moves from outside of the house to the living room 2 (Step 303). A beacon signal transmitted from the reproduction apparatus B' in the living room 2 is received by the mobile terminal 30 (Step 304).

The distance calculation unit 43 calculates a distance to the reproduction apparatus B'. Then reproduction control unit 44 determines whether the distance to the reproduction apparatus B' is within a certain distance (equal to or less than the first threshold value) or not. In a case where a determination result indicates Yes, the reproduction apparatus B' starts the transfer reproduction (Step 305).

To achieve this, in the example shown in FIG. 6, through the Bluetooth communication or wireless LAN communication, the mobile terminal 30 distributes the transfer target content to the reproduction apparatus B' (Step 306). As a result, the reproduction apparatus B' starts streaming and executes the transfer reproduction (Step 307).

In a case where the mobile terminal 30 is reproducing a content on a cloud or a content in the server apparatus 20, an instruction to obtain and reproduce the content is transmitted to the reproduction apparatus B'. As a result, the content can be transferred from the mobile terminal 30 to the reproduction apparatus B'.

On a basis of the distance to the reproduction apparatus B', the power supply control, the control of the reproduction sound volume, fade-in/fade-out, or the like as described above may be performed. In the example shown in FIG. 6, when the transfer target content is distributed, the reproduction by the mobile terminal 30 is stopped (Step 308). In this way, the content may be exclusively reproduced, or the mobile terminal 30 and the reproduction apparatus B' may perform synchronous reproduction.

Even in a case where the content is transferred from the mobile terminal 30, it is possible to provide such a high-quality listening or viewing experience that music reproduction follows a movement of a user. For example, a user goes jogging with the mobile terminal 30 to which a headphone is connected, and then the user goes back home and removes the headphone in the living room 2. At this time, the same content is being reproduced in the room. This listening or viewing experience can be easily achieved.

Further, an operation to transfer the content, such as an NFC (Near Field Communication) touch, a Bluetooth connection operation, and a transfer operation on an application is unnecessary. Therefore, a very high operability can be exerted.

As described above, in the content reproduction system 100 according to this embodiment, on the basis of the beacon signal transmitted from each of the reproduction apparatuses 10, the distance from the mobile terminal 30 to each of the reproduction apparatuses 10 is calculated. On the basis of the calculated distances, various kinds of control relating to the content transfer reproduction is performed. As a result, the high-quality listening or viewing experience can be provided to the user.

Further, the distances to the reproduction apparatuses are calculated on the basis of the beacon signal using the BLE, so a device dedicated to a position and proximity detection such as a proximity sensor and a lens is unnecessary. Further, a high load process for specifying not an object but a user is also unnecessary. As a result, device cost can be sufficiently suppressed. It should be noted that a distance of approximately 10 m to several cm can be calculated on a basis of a beacon signal using the BLE.

Other Embodiments

The present technology is not limited to the embodiment described above, and can achieve various other embodiments.

FIG. 7 is a diagram for explaining control to transfer a content that is being reproduced by the reproduction apparatus A to the mobile terminal 30. For example, a content that can be reproduced by the mobile terminal 30 is caused to be reproduced by the reproduction apparatus 10. Then, in a case where a distance to the reproduction apparatus 10 is equal to or more than a certain distance (equal to or more than third threshold value), reproduction by the reproduction apparatus 10 is terminated, and the content is caused to be reproduced by the mobile terminal 30. As a result, it is possible to transfer the content from the reproduction apparatus 10 to the mobile terminal 30.

As a result, as shown in FIG. 7, in a case where a user gets out of the living room 2, leaves a house, and gets into a car 60 left in a parking lot to go for a drive, for example, a seamless listening or viewing experience along with a movement of the user can be achieved. It should be noted that a content reproduction system is constructed with an in-car audio (not shown) disposed in the car 60 included.

For example, in a state where a content is being reproduced by the reproduction apparatus 10 in the living room 2, when the user gets out of the living room 2 and moves to outside, the same content can be automatically reproduced from a headphone connected to the mobile terminal 30. Then, when the user gets into the car 60 and starts an engine, a distance is calculated on a basis of a beacon signal from the in-car audio in the car 60. On a basis of the distance, the content is transferred from the mobile terminal 30 to the in-car audio. The user removes the headphone and starts driving while enjoying the same content.

At a time of returning to the house after driving, the content can be transferred in order of the in-car audio, the mobile terminal 30, and the reproduction apparatus 10. Therefore, along with the movement from the car 60 to the living room, the user can enjoy the content smoothly and continuously without an operation.

In the case where the content is transferred between the reproduction apparatuses 10, for example, if the reproduction apparatus 10 does not exist within the distance range of the first threshold value from the mobile terminal 30, the content can be transferred by the mobile terminal 30.

To control the content reproduction operation, illumination of the reproduction apparatus 10 may be controlled. Examples of the illumination include illumination according to a variation of the distance to the reproduction apparatus B as the transfer destination, illumination at a time when the transfer reproduction is started, illumination according to control of the reproduction sound volume, or the like. For example, a predetermined color light can be turned on, or light can be blinked. In the reproduction apparatus A as the transfer source, the illumination may be controlled.

Further, in accordance with the distance to the reproduction apparatus 10 or various transfer operations, a sampler (for example, "Let's Go!", "C'mon!", "OK!", or the like) provided to the reproduction apparatus 10 may be output. The control of the illumination and the output of the sampler as described above enable higher-quality listening or viewing experience to be provided.

In the above, the case where the user carries the mobile terminal 30 is described. In addition to this, for example, the information processing apparatus according to the present technology is mounted on an apparatus that is moved on a predetermined route, and the apparatus is moved as appropriate, with the result that the content transfer reproduction, the control of the illumination, the output of the sampler, or the like may be performed. As a result, an interesting, high-quality attraction or the like can be achieved.

In the above, the various content reproduction methods performed by the reproduction apparatuses 10 are described, but do not have to be achieved simultaneously at all times. For example, in an environment in which only the near field communication is used with a network system unconstructed, or in an opposite environment, the present technology can also be applied. It should be noted that as the network system, the home network that is constructed in home is used as an example, but in a local network constructed in a company, a facility, or the like, the present technology can also be applied.

Further, in a case where the reproduction operation of the reproduction apparatus A as the transfer source cannot be controlled, but only the transfer reproduction operation by the reproduction apparatus B as the transfer destination can be performed, a high-quality listening or viewing experience can also be achieved. Further, even in a case where the synchronous reproduction cannot be performed, and the reproduction position or the like cannot be synchronized, the reproduction apparatuses B as the transfer destination are caused to automatically reproduce the same content, thereby making it possible to reproduce the content along with the movement of the user and exert a sufficient effect.

As the control based on the distance to the reproduction apparatus 10, the operation other than the transfer reproduction may be controlled. For example, at a time when a content is started to be reproduced, on a basis of a distance to the reproduction apparatuses 10 disposed in a house, the reproduction operation is controlled. For example, in a case where an instruction is given to the plurality of detected reproduction apparatuses 10 to perform synchronous reproduction, automatic control is performed in such a manner that the reproduction apparatus 10 close to the mobile terminal 30 is caused to reproduce the content or increase the reproduction sound volume to achieve an appropriate viewing environment. On the other hand, automatic control is performed in such a manner that the reproduction apparatus 10 apart from the mobile terminal 30 is caused to decrease the reproduction sound volume, stop the music reproduction, turn off the power, or suppress other unnecessary operations. In this way, in accordance with the distances to the reproduction apparatuses, different kinds of control may be performed for each reproduction apparatus.

Out of the characteristic parts according to the present technology described above, at least two characteristic parts can be combined. That is, the various characteristic parts described in the embodiments may be arbitrarily combined without discrimination of the embodiments. Further, the various effects described above are merely examples and are not limited. Other effects may be exerted.

It should be noted that the present technology can take the following configurations.

(1) An information processing method executed by a computer, including:

calculating, on a basis of a beacon signal transmitted from a reproduction apparatus capable of reproducing a content, a distance from the computer to the reproduction apparatus; and controlling an operation of transfer reproduction by the reproduction apparatus on a basis of the calculated distance, the transfer reproduction being causing a content that is being reproduced by a different reproduction apparatus to be transferred and reproduced.

(2) The information processing method according to (1), in which the step of controlling the operation of the transfer reproduction includes starting the transfer reproduction by the reproduction apparatus in a case where the distance to the reproduction apparatus is equal to or less than a first threshold value.

(3) The information processing method according to (1) or (2), in which controlling the operation of the transfer reproduction includes at least one of power supply control of the reproduction apparatus and control of a reproduction sound volume of a transfer target content.

(4) The information processing method according to any one of (1) to (3), further including:

calculating a distance from the computer to the different reproduction apparatus on a basis of a beacon signal transmitted from the different reproduction apparatus, in which the step of controlling the operation of the transfer reproduction includes controlling, on the basis of the calculated distance to the different reproduction apparatus, a reproduction operation of a transfer target content by the different reproduction apparatus.

(5) The information processing method according to (4), in which
the step of controlling the operation of the transfer reproduction includes terminating reproduction by the different reproduction apparatus in a case where the distance to the different reproduction apparatus is equal to or more than a second threshold value.

(6) The information processing method according to (4) or (5), in which
controlling the reproduction operation of the transfer target content by the different reproduction apparatus includes at least one of power supply control of the different reproduction apparatus and control of a reproduction sound volume of the transfer target content.

(7) The information processing method according to any one of (1) to (6), in which
the step of controlling the operation of the transfer reproduction includes causing the operation of the transfer reproduction by the reproduction apparatus to be synchronized with a reproduction operation by the different reproduction apparatus.

(8) The information processing method according to (7), in which
the step of controlling the operation of the transfer reproduction includes causing a transfer target content to be faded out by the different reproduction apparatus and causing the transfer target content to be faded in by the reproduction apparatus.

(9) The information processing method according to any one of (1) to (8), in which
the step of controlling the operation of the transfer reproduction includes causing a transfer target content reproduced by the computer as the different reproduction apparatus to be transferred to the reproduction apparatus and reproduced by the reproduction apparatus.

(10) The information processing method according to any one of (1) to (9), further including:
reproducing, by the reproduction apparatus, a content capable of being reproduced by the computer; and
terminating reproduction by the reproduction apparatus and reproducing the content by the computer in a case where the distance to the reproduction apparatus is equal to or more than a third threshold value.

(11) The information processing method according to any one of (1) to (10), further including:
detecting the reproduction apparatus through wireless communication, and obtaining, from the detected reproduction apparatus, an identification signal for identifying the beacon signal transmitted from the reproduction apparatus; and
associating, on the basis of the obtained identification signal, the beacon signal transmitted from the reproduction apparatus with the detected reproduction apparatus.

REFERENCE SIGNS LIST

A reproduction apparatus as transfer source
B reproduction apparatus as transfer destination
1 home network
10 reproduction apparatus
11 network module
12 Bluetooth module
20 server apparatus
30 mobile terminal
34 speaker
41 network module
42 Bluetooth module
43 distance calculation unit
44 reproduction control unit
50 beacon signal
100 content reproduction system

The invention claimed is:

1. An information processing method, the method comprising:
in a computer:
calculating, based on a beacon signal transmitted from a first reproduction apparatus, a first distance from the computer to the first reproduction apparatus;
calculating, based on a beacon signal transmitted from a second reproduction apparatus, a second distance from the computer to the second reproduction apparatus;
controlling a transfer reproduction operation, wherein the transfer reproduction operation by the first reproduction apparatus is controlled based on the calculated first distance and the calculated second distance;
executing synchronous reproduction of a transfer target content by the first reproduction apparatus and the second reproduction apparatus until the calculated second distance becomes one of equal to or more than double the calculated first distance;
changing a reproduction sound volume of the first reproduction apparatus and a reproduction sound volume of the second reproduction apparatus, wherein
the change in the reproduction sound volume is based on a change in the calculated first distance and the calculated second distance, and
the change in the reproduction sound volume of the first reproduction apparatus is opposite to the change in the reproduction sound volume of the first reproduction apparatus; and
terminating reproduction of the transfer target content by the second reproduction apparatus in a case where the calculated second distance becomes one of equal to or more than double the calculated first distance.

2. The information processing method according to claim 1, wherein controlling the transfer reproduction operation further includes starting the transfer reproduction operation by the first reproduction apparatus based on the calculated first distance being one of equal to or less than a threshold value.

3. The information processing method according to claim 1, wherein controlling the transfer reproduction operation further includes controlling the reproduction sound volume of the transfer target content reproduced at the first reproduction apparatus.

4. The information processing method according to claim 1, further comprising controlling at least one of a power supply of the second reproduction apparatus or the reproduction sound volume of the transfer target content reproduced at the second reproduction apparatus.

5. The information processing method according to claim 1, wherein controlling the transfer reproduction operation further includes synchronizing the transfer reproduction operation with a reproduction operation associated with the second reproduction apparatus.

6. The information processing method according to claim 5, wherein
controlling the transfer reproduction operation further includes:
fading out the transfer target content by the second reproduction apparatus; and
fading in the transfer target content by the first reproduction apparatus.

7. The information processing method according to claim 1, wherein controlling the transfer reproduction operation further includes:
transferring the transfer target content reproduced by the computer to the first reproduction apparatus, wherein the computer functions as the second reproduction apparatus; and
reproducing the transfer target content by the first reproduction apparatus.

8. The information processing method according to claim 1, further comprising:
reproducing a content by the first reproduction apparatus, wherein the content is capable of being reproduced by the computer;
terminating reproduction of the content associated with the first reproduction apparatus; and
reproducing the content by the computer based on the first distance from the computer to the first reproduction apparatus being one of equal to or more than a threshold value.

9. The information processing method according to claim 1, further comprising:
detecting the first reproduction apparatus via a wireless communication;
obtaining, from the detected first reproduction apparatus, an identification signal for identifying the beacon signal transmitted from the first reproduction apparatus; and
associating, based on the obtained identification signal, the beacon signal transmitted from the first reproduction apparatus with the detected first reproduction apparatus.

10. A non-transitory computer-readable medium having stored thereon, computer-executable instructions which, when executed by a computer, cause the computer to execute operations, the operations comprising:
calculating, based on a beacon signal transmitted from a first reproduction apparatus, a first distance from the computer to the first reproduction apparatus;
calculating, based on a beacon signal transmitted from a second reproduction apparatus, a second distance from the computer to the second reproduction apparatus;
controlling a transfer reproduction operation, wherein the transfer reproduction operation by the first reproduction apparatus is controlled based on the calculated first distance and the calculated second distance;
executing synchronous reproduction of a transfer target content by the first reproduction apparatus and the second reproduction apparatus until the calculated second distance becomes one of equal to or more than double the calculated first distance;
changing a reproduction sound volume of the first reproduction apparatus and a reproduction sound volume of the second reproduction apparatus, wherein
the change in the reproduction sound volume is based on a change in the calculated first distance and the calculated second distance, and
the change in the reproduction sound volume of the first reproduction apparatus is opposite to the change in the reproduction sound volume of the first reproduction apparatus; and
terminating reproduction of the transfer target content by the second reproduction apparatus in a case where the calculated second distance becomes one of equal to or more than double the calculated first distance.

11. An information processing apparatus, comprising:
circuitry configured to:
calculate, based on a beacon signal transmitted from a first reproduction apparatus, a first distance from the information processing apparatus to the first reproduction apparatus;
calculate, based on a beacon signal transmitted from a second reproduction apparatus, a second distance from the information processing apparatus to the second reproduction apparatus;
control a transfer reproduction operation, wherein the transfer reproduction operation by the first reproduction apparatus is controlled based on the calculated first distance and the calculated second distance;
execute synchronous reproduction of a transfer target content by the first reproduction apparatus and the second reproduction apparatus until the calculated second distance becomes one of equal to or more than double the calculated first distance;
change a reproduction sound volume of the first reproduction apparatus and a reproduction sound volume of the second reproduction apparatus, wherein
the change in the reproduction sound volume is based on a change in the calculated first distance and the calculated second distance, and
the change in the reproduction sound volume of the first reproduction apparatus is opposite to the change in the reproduction sound volume of the first reproduction apparatus; and
terminate reproduction of the transfer target content by the second reproduction apparatus in a case where the calculated second distance is one of equal to or more than double the calculated first distance.

12. An information processing system, comprising:
one or more reproduction apparatuses, wherein each reproduction apparatus of the one or more reproduction apparatuses includes a first circuitry configured to:
reproduce a content; and
transmit a respective beacon signal; and
an information processing apparatus that includes a second circuitry configured to:
calculate, based on a beacon signal transmitted from a first reproduction apparatus of the one or more reproduction apparatuses, a first distance from the information processing apparatus to the first reproduction apparatus;
calculate, based on a beacon signal transmitted from a second reproduction apparatus of the one or more reproduction apparatuses, a second distance from the information processing apparatus to the second reproduction apparatus;
control a transfer reproduction operation, wherein the transfer reproduction operation by the first reproduction apparatus is controlled based on the calculated first distance and the calculated second distance;
execute synchronous reproduction of the content by the first reproduction apparatus and the second reproduction apparatus until the calculated second distance becomes one of equal to or more than double the calculated first distance;
change a reproduction sound volume of the first reproduction apparatus and a reproduction sound volume of the second reproduction apparatus, wherein
the change in the reproduction sound volume is based on a change in the calculated first distance and the calculated second distance, and
the change in the reproduction sound volume of the first reproduction apparatus is opposite to the change in the reproduction sound volume of the first reproduction apparatus; and
terminate reproduction of the content by the second reproduction apparatus in a case where the calculated second distance is one of equal to or more than double the calculated first distance.

13. The information processing system according to claim 12, wherein
the second circuitry is further configured to:
reproduce the content; and
transfer the content reproduced by the second circuitry to each reproduction apparatus of the one or more reproduction apparatuses, and
the first circuitry is further configured to reproduce the content transferred from the second circuitry.

14. The information processing method according to claim 1, wherein controlling the transfer reproduction operation further includes
controlling an illumination associated with the first reproduction apparatus based on controlling the reproduction sound volume of the transfer target content reproduced at the first reproduction apparatus.

15. The information processing method according to claim 1, wherein controlling the transfer reproduction operation further includes
controlling an illumination associated with the first reproduction apparatus at a time at which the reproduction of the transfer target content by the first reproduction apparatus is started.

* * * * *